(12) United States Patent
Rozental et al.

(10) Patent No.: US 12,320,694 B2
(45) Date of Patent: Jun. 3, 2025

(54) HOMODYNE TIME-DOMAIN ACOUSTO-OPTIC IMAGING FOR LOW-GAIN PHOTODETECTORS

(71) Applicants: TECHNION RESEARCH & DEVELOPMENT FOUNDATION LIMITED, Haifa (IL); NRC SOREQ, Yavne (IL)

(72) Inventors: Amir Rozental, Haifa (IL); Ahiad Levi, Haifa (IL); Yoav Hazan, Haifa (IL); Aner Lev, Modiin (IL)

(73) Assignees: TECHNION RESEARCH DEVELOPMENT FOUNDATION LIMITED, Haifa (IL); NRC SOREQ, Yavne (IL)

( * ) Notice: Subject to any disclaimer, the term of this patent is extended or adjusted under 35 U.S.C. 154(b) by 188 days.

(21) Appl. No.: 18/090,837

(22) Filed: Dec. 29, 2022

(65) Prior Publication Data

US 2023/0213377 A1    Jul. 6, 2023

Related U.S. Application Data

(60) Provisional application No. 63/295,067, filed on Dec. 30, 2021.

(51) Int. Cl.
*G02F 1/125*    (2006.01)
*G01H 9/00*    (2006.01)
*G02F 1/335*    (2006.01)

(52) U.S. Cl.
CPC ............. *G01H 9/006* (2013.01); *G02F 1/125* (2013.01); *G02F 1/335* (2013.01)

(58) Field of Classification Search
CPC .......... G02F 1/11; G01H 9/006; A61B 5/0261
See application file for complete search history.

(56) References Cited

U.S. PATENT DOCUMENTS

| | | | |
|---|---|---|---|
| 2002/0030811 | A1 | 3/2002 | Schindler |
| 2006/0062440 | A1 | 3/2006 | Hollars et al. |
| 2006/0176479 | A1 | 8/2006 | Laurence et al. |

(Continued)

FOREIGN PATENT DOCUMENTS

| | | | | |
|---|---|---|---|---|
| CN | 101360447 A | * | 2/2009 | ........... A61B 5/0062 |
| WO | WO-2015127661 A1 | * | 9/2015 | ........... A61B 5/0066 |

OTHER PUBLICATIONS

Maurizio Casalino, "Free-Space Schottky Graphene/Silicon Photodetectors Operating at 2 μm", 2018 (Year: 2018).*

(Continued)

*Primary Examiner* — Maurice C Smith
(74) *Attorney, Agent, or Firm* — The Roy Gross Law Firm, LLC; Roy D. Gross (57) ABSTRACT

A laser system for acousto-optics imaging is disclosed. The system comprises: a continuous wave laser source; a first beam splitter configured to split a laser emitted by the continuous wave laser source into a lasing beam and a reference beam; a lasing optical fiber diffusing the lasing beam to a subject; a reference optical fiber providing the reference beam; a collecting optical fiber capable of receiving a scattered beam from the subject; a second beam splitter for merging the scattered and reference beams into a merged beam, and at least one photodetector assembly with a bandwidth higher than the ultrasound frequency to detect the merged beam.

17 Claims, 8 Drawing Sheets

(56) References Cited

U.S. PATENT DOCUMENTS

| | | | |
|---|---|---|---|
| 2010/0304358 A1 | 12/2010 | Nie et al. | |
| 2014/0100442 A1* | 4/2014 | Begin | A61B 5/066 |
| | | | 600/414 |
| 2015/0349184 A1* | 12/2015 | Hsu | H01L 27/1461 |
| | | | 257/26 |

OTHER PUBLICATIONS

Levi A, Monin S, Hahamovich E, Lev A, Sfez BG, Rosenthal A. Increased SNR in acousto-optic imaging via coded ultrasound transmission. Opt Lett. May 15, 2020;45(10):2858-2861. doi: 10.1364/OL.392617. PMID: 32412486.

Hakamata, T. (Ed). (2006) Photomultiplier Tubes: Basics and Application. 3rd Edition, Hamamatsu Photonics K.K. https://www.hamamatsu.com/resources/pdf/etd/PMT_handbook_v3aE.pdf.

Eggebrecht AT, Ferradal SL, Robichaux-Viehoever A, Hassanpour MS, Dehghani H, Snyder AZ, Hershey T, Culver JP. Mapping distributed brain function and networks with diffuse optical tomography. Nat Photonics. Jun. 2014;8(6):448-454. Published Online: May 18, 2014. doi: 10.1038/nphoton.2014.107. PMID: 25083161; PMCID: PMC4114252.

Durduran T, Choe R, Baker WB, Yodh AG. Diffuse Optics for Tissue Monitoring and Tomography. Rep Prog Phys. Jul. 2010;73(7):076701. Published online Jun. 2, 2010. doi: 10.1088/0034-4885/73/7/076701. PMID: 26120204; PMCID: PMC4482362.

Gunther, J., Andersson-Engels, S. Review of current methods of acousto-optical tomography for biomedical applications. Front. Optoelectron. 10, 211-238 (2017). https://doi.org/10.1007/s12200-017-0718-4.

Resink SG, Boccara AC, Steenbergen W. State-of-the art of acousto-optic sensing and imaging of turbid media. J Biomed Opt. Apr. 2012;17(4):040901. doi: 10.1117/1.JBO.17.4.040901. PMID: 22559674.

Lev A, Kotler Z, Sfez BG. Ultrasound tagged light imaging in turbid media in a reflectance geometry. Opt Lett. Mar. 15, 2000;25(6):378-80. doi: 10.1364/ol.25.000378. PMID: 18059885.

Granot E, Lev A, Kotler Z, Sfez BG, Taitelbaum H. Detection of inhomogeneities with ultrasound tagging of light. J Opt Soc Am A Opt Image Sci Vis. Aug. 2001;18(8):1962-7. doi: 10.1364/josaa.18.001962. PMID: 11488500.

Lev A, Sfez BG. Direct, noninvasive detection of photon density in turbid media. Opt Lett. Apr. 1, 2002;27(7):473-5. doi: 10.1364/ol.27.000473. PMID: 18007835.

A. R. Levi, Y. Hazan, and A. Rosenthal, "Homodyne Time-Domain Acousto-Optics Imaging for High SNR," in Biophotonics Congress: Biomedical Optics 2022 (Translational, Microscopy, OCT, OTS, Brain), Technical Digest Series (Optica Publishing Group, 2022), paper OS3D.6.

Levi, A. R., Hazan, Y., Lev, A., Sfez, B., & Rosenthal, A. (2022). Homodyne Time-Domain Acousto-Optic Imaging for Low-Gain Photodetectors. arXiv preprint arXiv:2203.13796.

Lorenzo, J.R. (2012). Principles of Diffuse Light Propagation: Light Propagation in Tissues with Applications in Biology and Medicine. World Scientific. https://doi.org/10.1142/7609.

English BP, Singer RH. A three-camera imaging microscope for high-speed single-molecule tracking and super-resolution imaging in living cells. Proc SPIE Int Soc Opt Eng. Aug. 21, 2015;9550:955008. doi: 10.1117/12.2190246. PMID: 26819489; PMCID: PMC4724806.

* cited by examiner

HOMODYNE TIME-DOMAIN ACOUSTO-OPTIC IMAGING FOR LOW-GAIN PHOTODETECTORS

CROSS REFERENCE TO RELATED APPLICATIONS

This application claims the benefit of priority of U.S. Provisional Patent Application No. 63/295,067 filed Dec. 30, 2021, entitled "HOMODYNE TIME-DOMAIN ACOUSTO-OPTIC IMAGING FOR LOW-GAIN PHOTO-DETECTORS", the contents of which are incorporated herein by reference in their entirety.

FIELD OF THE INVENTION

The present invention relates generally to systems and methods for medical imaging. More specifically, the present invention relates to acousto-optic imaging.

BACKGROUND

Acousto-optics imaging (AOI) is a hybrid imaging modality that maps the light fluence in deep tissue by local ultrasound (US) modulation of the diffused photons. Since the intensity of the modulated photons is relatively low, AOI systems often rely on high-gain photodetectors, e.g. photomultiplier tubes (PMTs), which limit scalability due to size and cost and may significantly increase the relative shot-noise in the detected signal due to low quantum yields or gain noise. During in vivo applications, the AOI requires the system to be time-domain operation in order to have a response time faster than the ultrasound and speckle-decorrelation times.

Deep-tissue optical imaging is generally performed by illuminating the tissue over a large area and using the reemitted diffused light to form an image representative of the optical properties of the tissue. By using tomographic illumination and detection patterns, combined with optimization-based in version algorithms, depth-resolved imaging may be performed, as has been demonstrated in the field of diffuse optical tomography (DOT). However, purely optical techniques such as DOT are inherently limited in their spatial resolution due to light diffusion, mathematically characterized by an ill-conditioned inverse problem.

Acousto-optics imaging can improve the resolution of purely optical techniques deep-tissue imaging by using ultrasound. In AOI, the tissue is both illuminated with a coherent laser and insonified with an ultrasound transducer, leading to pressure-induced refractive-index modulation and vibrations of the optical scatterers in the insonified regions. As a result, light that travels through the insonified regions experiences an phase modulation with the same frequency as that of the ultrasound wave. Because of the high coherence of the laser, the reemitted light exhibits a speckle pattern in which the intensity of each speckle grain is temporally modulated with the ultrasound frequency. The modulation depth of the speckle pattern may be measured using various methods, enabling a localized detection of light in the tissue. AOI may be performed with a focused US beam that scans the imaged region or a set of plane US waves, enabling the visualization of the light fluence within the tissue with acoustic resolution. To optimize the signal-to-noise ratio (SNR) of the measurement, parallel detection of uncorrelated speckle grains is required, which is often performed by digital cameras. However, the low time resolution of cameras introduces two difficulties that limit their use in vivo. First, it complicates the distinction between the effect of US modulation and speckle decorrelation, as both these phenomena are faster than the camera frame-rate. Second, it limits the use of US bursts, for which the acoustic time of flight may be used for depth sectioning.

In order to overcome speckle decorrelation and enable the use of acoustic bursts, time-domain AOI (TD-AOI) may be used, in which the optical detection is performed with detectors that operate at a higher bandwidth than that of the US transducer. Because of the low intensity of the US-modulated light, TD-AOI is conventionally performed with photodetectors with a high internal gain (e.g., PMTs) that use the avalanche effect to multiply the current created by a single photon. However, despite the high gain, this approach may lead to a lower SNR in the AOI measurement. First, the avalanche is an inherently stochastic process in which the gain varies randomly, thus increasing the relative shot noise in the signal. Second, in the case of PMT, the relative shot noise is further increased by the low quantum yield of the detector. Third, the cost and complexity of high-gain detectors limits their scale-up to multi-element arrays, required for high-SNR operation.

SUMMARY

Some embodiments of the present invention are directed to a laser system for acousto-optics imaging, comprising: a continuous wave laser source; a first beam splitter configured to split a laser emitted by the continuous wave laser source into a lasing beam and a reference beam; a lasing optical fiber diffusing the lasing beam to a subject; a reference optical fiber providing the reference beam; a collecting optical fiber capable of receiving a scattered beam from the subject; a second beam splitter for merging the scattered and reference beams into a merged beam, and at least one photodetector assembly with a bandwidth higher than the ultrasound frequency to detect the merged beam.

In some embodiments, the laser system further comprises: a processor; a function generator controlled by the processor to create an arbitrary function for an ultrasound wave, and an ultrasound transducer controlled by the function generator to produce the ultrasound wave and receive a reflected ultrasound wave from the subject, wherein the controller is further configured to: process the reflected ultrasound wave and a signal from the at least one photodetector assembly to generate an image.

In some embodiments, the at least one photodetector assembly comprises: a photodiode, an amplifier, and a voltage buffer. In some embodiments, the at least one photodetector assembly lacks an internal gain of the photocurrent. In some embodiments, a power of the continuous wave laser is splitted between the lasing beam and the reference beam, where the ratio between the power that is delivered to the subject and the power that is transmitted from the reference beam is 100 to 1. In some embodiments, the reference beam is polarized and fed through polarization-maintaining single mode optical fiber. In some embodiments, the length of the reference beam fiber is the sum of the length of the collecting fiber and the lasing fiber.

Some embodiments of the present invention are directed to a method of acousto-optics imaging, comprising: activating a continuous wave laser to generate a continuous wave laser beam; splitting the continuous wave laser beam to a reference beam and a lasing beam; projecting the lasing beam onto a subject; collecting scattered light from the subject; merging the scattered light with the reference beam, creating a merged beam, and delivering the merged beam to at least one photodetector assembly.

In some embodiments, the method further comprises: generating an arbitrary function for an ultrasound wave using a processor; activating an ultrasound transducer to propagate the ultrasound wave generated at the arbitrary function through the subject's tissue, and receiving a reflected ultrasound wave from the subject. In some embodiments, the method further comprises: processing the reflected ultrasound wave and a signal of the at least one photodetector assembly, and generating an ultrasound image of the subject's tissue on which the signals from the at least one photodetector assembly is overlaid.

In some embodiments, the lasing beam is diffused into the subject's tissue. In some embodiments, the splitting of the continuous wave laser beam is conducted by a first beam splitter. In some embodiments, the merging of the scattered light with the reference beam is conducted by a second beam splitter. In some embodiments, scattered light from the subject's tissue is projected onto an optical fiber. In some embodiments, the reference beam is coupled into a polarization-maintaining single mode optical fiber and projected onto the second beam splitter.

In some embodiments, the method further comprises: coupling the merged beam into a multimode optical fiber to deliver the merged beam to the at least one photodetector assembly. In some embodiments, each photodetector assembly comprises: a photodiode, an amplifier, and a voltage buffer. In some embodiments, a total time frame from activating a continuous wave laser to generate a continuous wave laser through delivering the merged beam to at least one photodetector assembly is at most 1 ms.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Aspects of the present invention provide a method to replace the PMT conventionally used in TD-AOI with a simple photodiode (PD) that does not contribute excessive noise and has a significantly higher quantum efficiency. In some embodiments, to allow the PD to measure the weak modulated optical signal, a homodyne AOI setup is introduced allowing amplification of the signal using an interference with a reference beam from the same source while maintaining its SNR.

In some embodiments, in the shot-noise limited detection case of TD-AOI, the SNR at the output of the photodetector is given by equation (1):

(1)

$$SNR_{PD} = \sqrt{\frac{\eta P}{2\hbar\omega F \Delta f}},$$

Where $\eta$ is the quantum efficiency, P is the optical power, $\omega$ is the angular frequency of the light, F is the noise factor, h is Planck's constant, and $\Delta f$ is the measurement bandwidth. The noise factor F is a result of gain fluctuations that occur when the gain is achieved via an avalanche process, and is typically smaller than 1.5. In the present invention, the conventional PMT used in photodetection may be replaced with a photodiode, further illustrated and discussed with respect to FIG. 2 below. In the case of a photodiode whose gain is provided in some embodiments by a trans-impedance amplifier, further illustrated and discussed with respect to FIG. 2 below, the gain may be considered constant, i.e. F=1. Accordingly, when shot-noise limited detection is assumed, the gain in SNR achieved by a photodiode over a PMT may be expressed by equation (2):

(2)

$$G_{SNR} = \sqrt{\frac{\eta_{PD}F_{PMT}}{\eta_{PMT}}}.$$

Using the values $\eta_{PD}$=76%, $\eta_{PMT}$=5%, and $F_{PMT}$=1.4, given for the components used in an experiment according to an embodiment of the invention further discussed below, a theoretical SNR gain of $G_{SNR}$=4.6 is obtained, leading to over a 4-fold enhancement in SNR using a photodiode, in an embodiment of the invention further discussed below, in comparison to a conventional PMT in TD-AOI.

Figure 1:
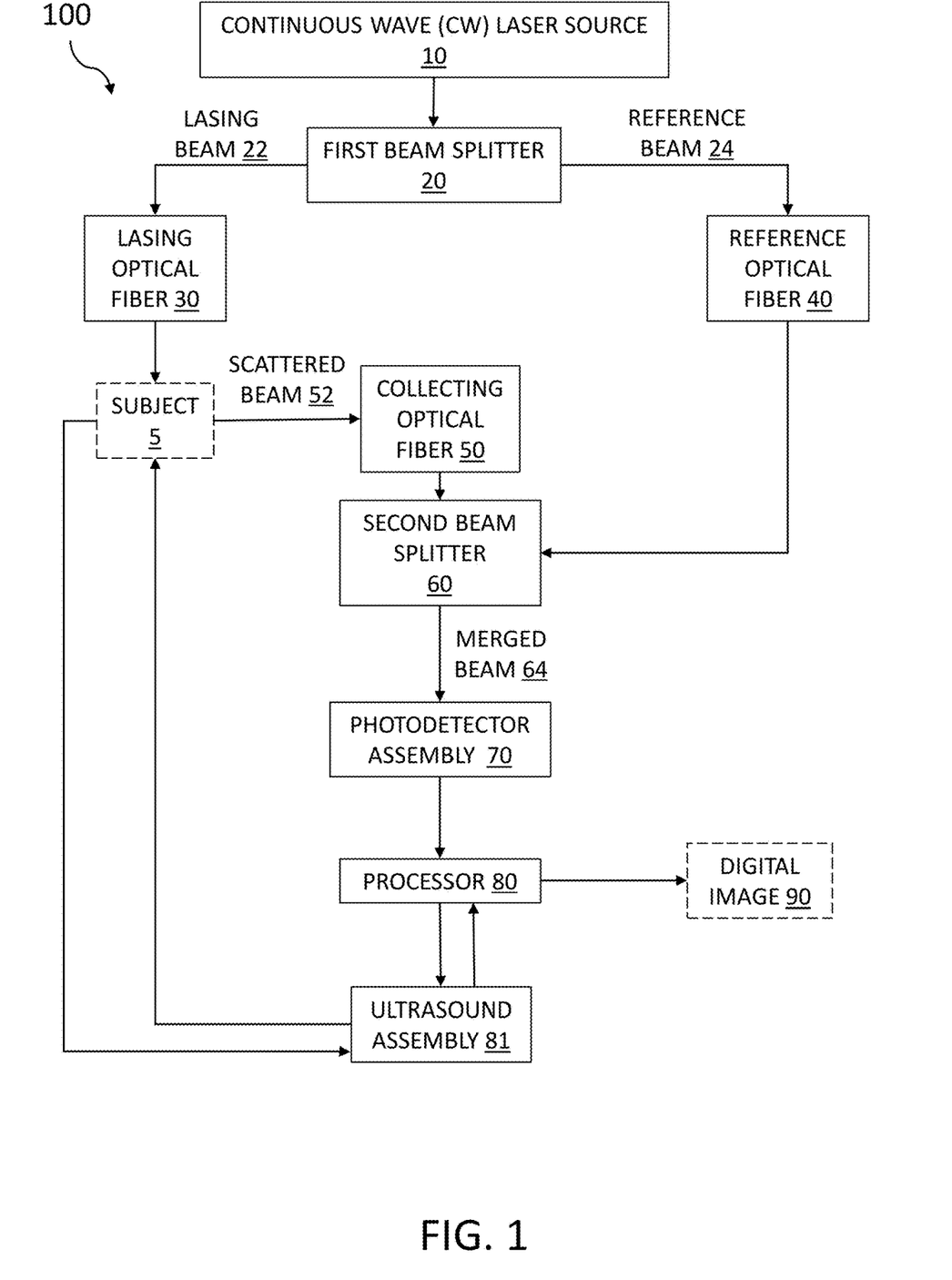
FIG. 1 is a block diagram showing an acousto-optic imaging according to some embodiments of the invention.

Reference is now made to FIG. 1 which is a block diagram of a system for acousto-optic imaging according to some embodiments of the invention. A system 100 may include a continuous wave laser source 10 and first beam splitter 20 configured to split a laser emitted by continuous wave laser 10 source into a lasing beam 22 and a reference beam 24.

In some embodiments, continuous wave laser source 10 may be any suitable laser source configured to provide laser at a wave length of between 600 to 1100 nm and a linewidth below 1 GHz. A nonlimiting example, for such laser source is a Toptica DL Pro 780 linearly polarized continuous wave laser with a linewidth of 50 KHz and wavelength of 780 nm.

In some embodiments, first beam splitter 20 is a polarization beam splitter. The first beam splitter may be combined with two half-wave plates (λ/2), illustrated and discussed with respect to FIG. 2 herein below. In some embodiments, a power of continuous wave laser 10 is splitted between lasing beam 22 and reference beam 24, where the ratio between the power of the lasing beam and the power of the reference beam is 100 to 1.

System 100 may further include a lasing optical fiber 30 diffusing lasing beam 22 into a subject 5, a reference optical fiber 40 providing reference beam 24, and a collecting optical fiber 50 capable of collecting a scattered beam 52 from the subject.

In some embodiments, assuming that the detection is performed over time scales faster than the speckle decorrelation time, the field of a single speckle of scattered light 52 collected from subject 5 may be represented by equation (3):

$$E_i = E_{bkg}e^{j\omega t} + E_{AO}e^{j\omega t}e^{j2\pi f_{US}t + \phi_i} \quad (3)$$

Where ω is the angular frequency of the light, $f_{US}$ is the US frequency and $\phi_i$ is a random phase distributed: $\phi_i \sim U[0, 2\pi]$ that represents the phase difference between the modulated and unmodulated parts of the field. $E_{bkg}$ and $E_{AO}$ are the amplitudes of the modulated and unmodulated fields, respectively, where it is assumed that $|E_{bkg}| >> |E_{AO}|$. The modulated field and the unmodulated field represent scattered beam 52. In conventional TD-AOI, the measured optical power consists of spatial integration over N speckles, which are statistically independent and identically distributed, leading to the following expression:

$$P_N \propto \sum_{i=1}^{N} |E_{bkg,i}e^{j\omega t} + E_{AO,i}e^{j\omega t}e^{j2\pi f_{US}t+\phi_i}|^2 =$$

$$\sum_{i=1}^{N} I_{bkg,i} + 2\sum_{i=1}^{N} \sqrt{I_{bkg,i}I_{AO,i}} \cos(2\pi f_{US}t + \phi_i).$$

Where $I_{bkg,i} = |E_{bkg,i}|^2$ and $I_{AO} = |E_{AO,i}|^2$. Since the phase $\phi_i$ is uniformly distributed over 2π, one obtains that $E[P^N] = NE[I_{bkg,i}]$ and $\text{var}[P^N] = NE[I_{bkg,i}I_{AO,i}]$. Accordingly, the signal in AOI is often calculated as the standard deviation of $I_{re}^N$ at the frequency and is proportional to $\sqrt{NI_{bkg}I_{AO}}$, where $I_{bkg} = E[I_{bkg,i}]$ and $I_{AO} = E[I_{AO,i}]$.

In some embodiments, the use of beam splitter 20 is intended to amplify an AOI signal by providing reference beam 24. In some embodiments, the field in equation (3) is interfered with reference beam 24, leading to the following expression for a single speckle grain:

$$E_i^{int} = E_{ref}e^{j\omega t} + E_{bkg}e^{j\omega t} + E_{AO}e^{j\omega t}e^{j2\pi f_{US}t+\phi_i}. \quad (5)$$

Where $E_{ref}$ refers to the field of reference beam 24. Assuming $I_{ref} >> I_{bkg}$, the following expression for the power of N grains is obtained by neglecting $I_{bkg}$:

(6)

$$P_{hom}^N \propto NI_{ref} + 2I_{ref}\sum_{i=1}^{N}\sqrt{I_{bkg,i}}\cos(2\pi f_{US}t + \phi_i).$$

Accordingly, the magnitude of the AOI signal in equation (6), described by the standard deviation of the expression, is given by $\sqrt{N_{ref}I_{AO}}$, and the average power is given by $\sqrt{N_{ref}I_{AO}}$. As can be seen from the above analysis, the use of homodyne detection enables one to amplify the AOI signal since $I_{ref} >> I_{bkg}$, where the goal is to achieve sufficient amplification such that shot noise becomes the dominant noise factor even when low-gain photodetectors are used.

In some embodiments, lasing optical fiber 30 is a multimode fiber, for example, having a core diameter of 62.5 μm and length of 2 μm.

In some embodiments, subject 5 may be any being having a tissue of interest. An experimental tissue may include a tissue-mimicking phantom made from silicone and 193 nm $TiO_2$ particles, with a speed of sound of 990 m/s.

In some embodiments, reference optical fiber 40 is a polarization-maintaining single mode optical fiber, for example, having a length of 4m. To compensate the inherit in-balance that may be created during the interference between reference beam 24 and scattered beam 52 reflected from subject 5, reference optical fiber 40 length is set to be equal to the sum of the lasing fiber 30 and collecting fiber 50.

In some embodiments, collecting optical fiber 50 is multimode optical fiber, for example, having 600 μm core diameter, 0.39 NA, and a length of 2 m. In some embodiments, reflected optical fiber 50 is projected through a linear polarizer to match the polarization of reference beam 24.

System 100 may further include a second beam splitter 60 for merging beams (e.g., reference beam 24 and scattered beam 52) into a merged beam 64. In a nonlimting example, the second beam splitter is a 50:50 beam splitter. In a nonlimiting example, merged beam 64 is coupled into a 200 μm core diameter fiber, illustrated and discussed with respect to FIG. 2 herein below.

In some embodiments, merged beam 64 may be detected by at least one photodetector assembly 70, illustrated and discussed with respect to FIG. 2 herein below.

System 100 may further include a processor 80 receiving a first signal from the photodetector assembly 70, and a second signal from an ultrasound assembly 81 connected to the processor. In some embodiments, processor 80 may overlay the signal from the photodetector assembly 70 on top of an ultrasound image received from ultrasound assembly 81 to produce a digital image 90 of subject 5's tissue.

Figure 8:
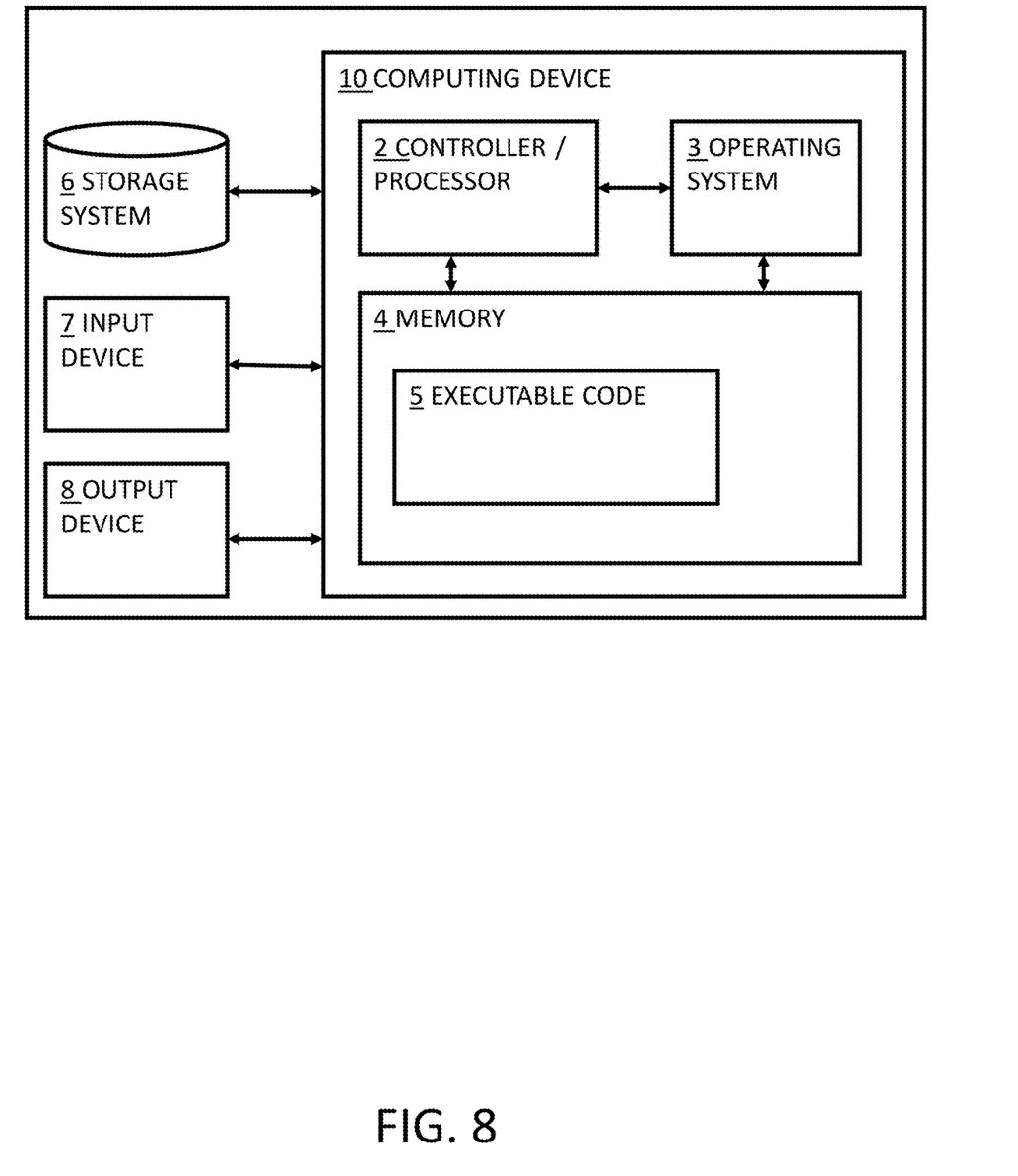
FIG. 8 is a block diagram, depicting a computing device which may be included in the acousto-optic imaging system according to some embodiments of the invention.

In some embodiments, processor 80 includes any computing device, for example, computing device 10 illustrated and discussed with respect to FIG. 8.

In some embodiments, photodetector assembly 70 is comprised of a photodiode, trans-impedance amplifier, and voltage buffer, illustrated and discussed with respect to FIG. 2 herein below. In some embodiments, photodiode 71 is a Thorlabs FDS-02 silicon photodiode with a quantum efficiency of 76%. In some embodiments, photodetector assembly 70 lacks an internal gain of the photocurrent.

In some embodiments, ultrasound assembly 81 is comprised of an ultrasound transducer, function generator, and voltage amplifier, illustrated and discussed with respect to FIG. 2 herein below. In some embodiments, the transducer is driven by arbitrary function generator. In some embodiments, arbitrary function generator is a Tabor Electronics Model 8026 waveform generator.

In a nonlimiting example, the ultrasound transducer is a Panametrics model A392S with a diameter of 38.1 mm, focal length of 9.4 cm, a Reighley length of 3.58 cm, and a cross-section FWHM of 4.25 mm. In some embodiments, each pulse of the transducer has a single period with a frequency of $f_{US}$=1.25 MHz, with an axial resolution of 0.79 mm and repetition rate of 5 kHz per sequence.

In a nonlimiting example, the voltage amplifier is a 48V peak-to-peak amplifier, leading to a peak pressure of approximately 250 kPa in the acoustic focus.

Figure 2:
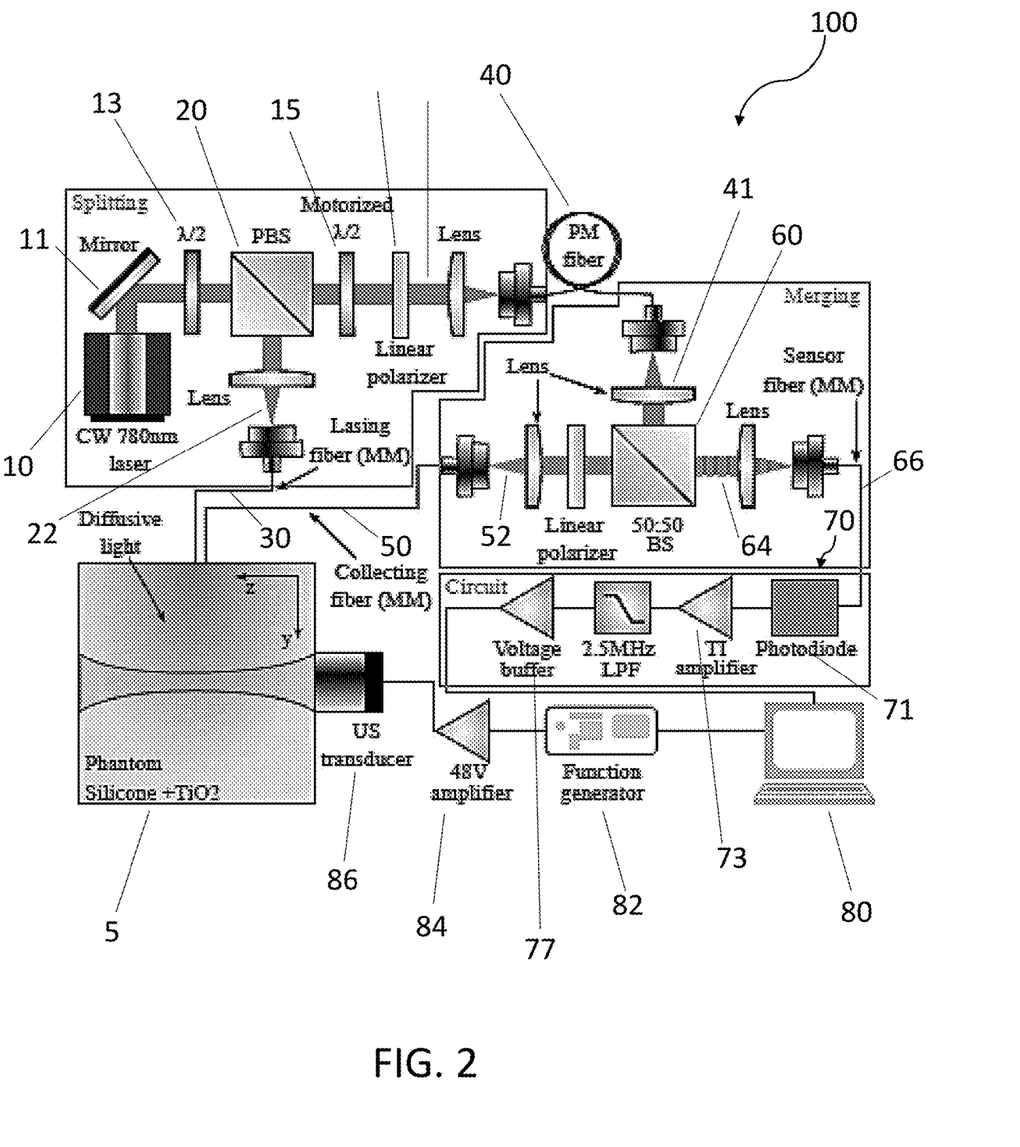
FIG. 2 is a detailed illustration of acousto-optic imaging system according to some embodiments of the invention.

Reference is now made to FIG. 2 which is a detailed illustration of acousto-optic imaging system 100 according to some embodiments of the invention. System 100 may further include mirror 11 configured to direct the continuous wave laser 10, half-wave plates 13 and 15 configured to optimize the power of the continuous wave laser and reference beams, respectively, and linear polarizer 17.

System 100 may further include focusing lens 41 for delivering reference beam 24 to second beam splitter 60, and merging optical fiber 66 for delivering merged beam 64 to photodetector assembly 70.

Photodetector assembly 70 may further include a circuit comprising: photodiode 71 for detecting merged beam 64, trans-impedance amplifier 73, and voltage buffer 77.

Ultrasound assembly 81 may further include a function generator 82 controlled by the processor 80, voltage amplifier 84 amplifying the signal of function generator 82, and ultrasound transducer 86 receiving the amplified waveform from voltage amplifier 84.

Figure 3:
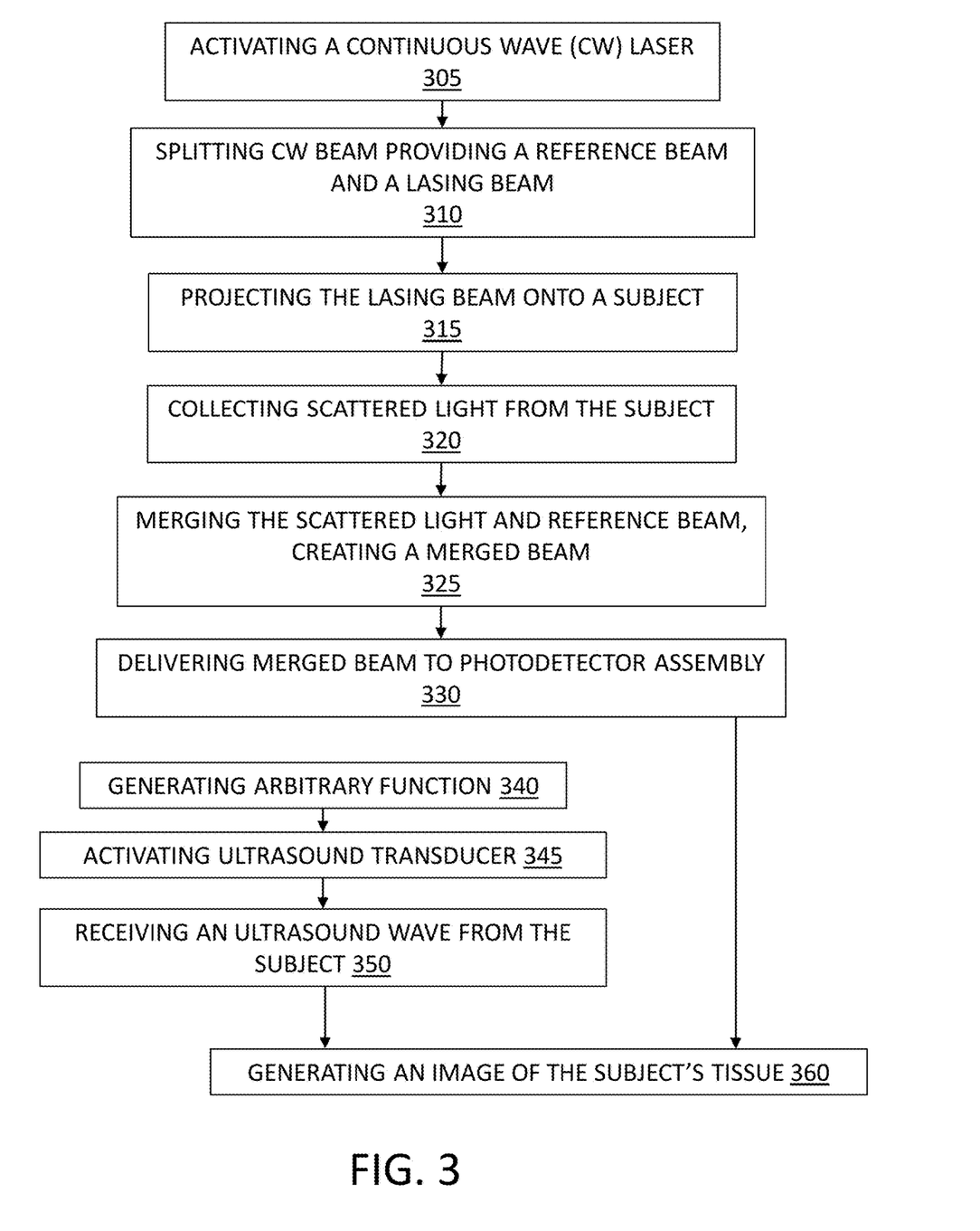
FIG. 3 shows a flowchart of a method of acousto-optic imaging according to some embodiments of the invention.

FIG. 3 is a flowchart of a method of acousto-optics imaging according to an embodiment of the invention. The method of FIG. 3 may be conducted by system 100 and supervised by processor 80.

In step 305, a continuous wave laser may be activated to generate a continuous wave laser beam. In some embodiments, processor 80 may activate continuous wave laser 10 to generate the continuous wave laser beam.

In step 310, the continuous wave laser beam may be splitted to a reference beam and a lasing beam. For example, first beam splitter 20 may split the continuous wave laser beam to lasing beam 22 and reference beam 24. In some embodiments, reference beam 24 may be coupled into reference optical fiber 40.

In step 315, the lasing beam may be projected onto a subject. For example, lasing beam 22 may be projected onto subject 5. In some embodiments, lasing beam 22 may be coupled into lasing optical fiber 30.

In step 320, scattered light from the subject may be collected. For example, scattered light beam 52 may be collected from subject 5. In some embodiments, scattered beam 52 may be coupled into collecting optical fiber 50.

In step 325, the scattered light and reference beam may be merged into a single merged beam.

In step 330, the merged beam may be delivered to a photodetector assembly to produce a voltage signal. For example, merged beam 64 may be delivered to photodetector assembly 70.

In step 340, an arbitrary function for an ultrasound wave may be generated. In some embodiments, processor 80 may activate function generator 82 to generate an ultrasound waveform.

In step 345, an ultrasound transducer may be activated to propagate the ultrasound wave through the subject's tissue. For example, ultrasound transducer 86 may receive an ultrasound wave from function generator 82 to propagate through the subject 5. In some embodiments, processor 80 may activate ultrasound transducer 86. In some embodiments, the ultrasound wave from function generator 82 may be amplified by voltage amplifier 84.

In step 350, an ultrasound wave may be received from the subject. For example, the ultrasound wave propagated by transducer 86 may be received by transducer 86.

In step 360, the received ultrasound wave and photodetector signal may be processed to generate an image of the subject's tissue. For example, ultrasound transducer 86 may deliver the received ultrasound wave to processor 80, while photodetector assembly 70 may simultaneously deliver the photodetector signal to processor 80. In some embodiments, processor 80 may overlay the signal from the photodetector assembly 70 on top of an ultrasound image received from ultrasound assembly 81 to produce a digital image of subject 5's tissue.

In some embodiments, a total time frame for steps 310 through 360 is at most 1 ms.

EXPERIMENTAL RESULTS

Experimental results recorded from an embodiment of the system and method are further detailed, to provide a reference of the utility of the invention.

To obtain optimal reference power, a preliminary calibration experiment was performed using system 100 illustrated and discussed with respect to FIG. 2. An ultrasound transducer 86 was positioned in a fixed coordinates on the X-Y plane, while lasing fiber 30 delivered lasing beam 22 to subject 5. In the experiment, subject 5 was a tissue-mimicking phantom made from silicone and 193 nm $TiO_2$ particles, with a speed of sound of 990 m/s. The scattered light 52 from subject 5 was coupled into collecting optical fiber 50.

During the first part of the experiment, the reference beam 24 was blocked, and scattered beam 52 was delivered to a photomultiplier tube (PMT), replacing the photodetector assembly 70 of system 100. In the experiment, the PMT was a Hamamatsu R5900U-20-L16 with a gain of $2.7 \times 10^5$. The PMT signal was used to calculate the baseline SNR of the measurement for conventional TD-AOI.

The measurement was then repeated according to an embodiment of the method. The reference beam 24 was unblocked, i.e. in a homodyne configuration according to an embodiment of system 100, providing reference beam 24 to second beam splitter 60 to merge with scattered beam 52 and create merged beam 64. In all the measurements, the SNR values were averaged over 30 measurements to minimize the variations between measurements.

Figure 4:
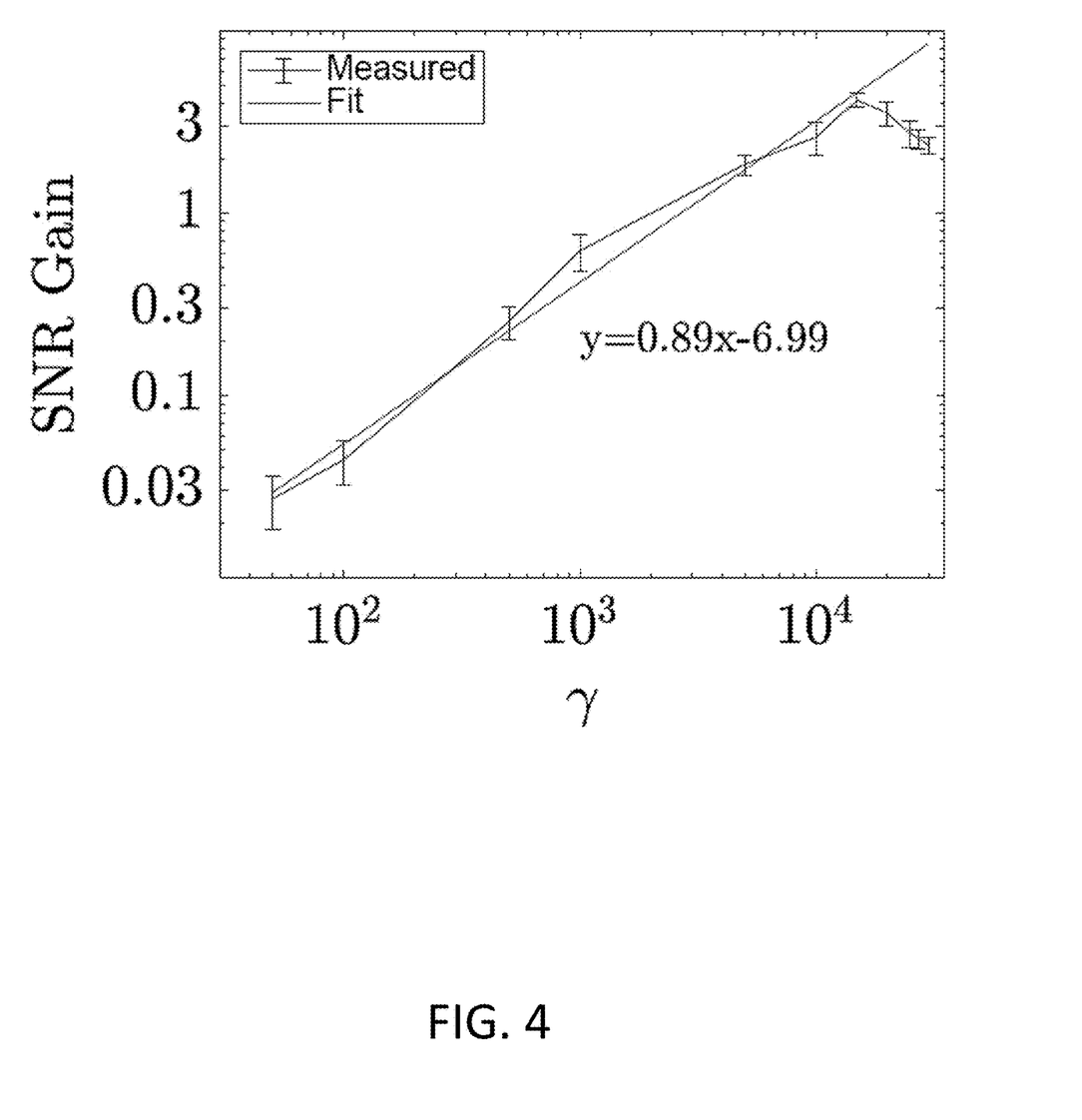
FIG. 4 shows a graph of experimental data of SNR gain of homodyne TD-AOI as a function of $\gamma=P_{ref}/P_{sig}$ according to some embodiments of the invention.

FIG. 4 shows a graph of experimental data of SNR gain of homodyne TD-AOI as a function of $\gamma=P_{ref}/P_{sig}$ according to some embodiments of the invention, where $P_{ref}$ and $P_{re}$ are the intensities of reference beam 24 and scattered light 52, respectively. The figure shows that for low values of $\gamma$, the SNR gain is lower than 1, i.e. homodyne system 100 according to an embodiment of the invention achieves a lower SNR than conventional TD-AOI. The reason for this result is that at low levels of $\gamma$, the detection with photodiodes (e.g., photodetector assembly 70) is not shot-noise limited, but rather dominated by additive noise from the detector. Accordingly, the SNR gain of homodyne-AOI according to an embodiment of the invention increases approximately linearly with $\gamma$ until a maximum value of 4.16, achieved for $\gamma=1.5\times10^4$, corresponding to reference power of 1.4 mW. As the power of reference beam 24 increased according to an embodiment of the invention, the SNR decreased due to saturation of photodetector assembly 70.

Figure 5A:
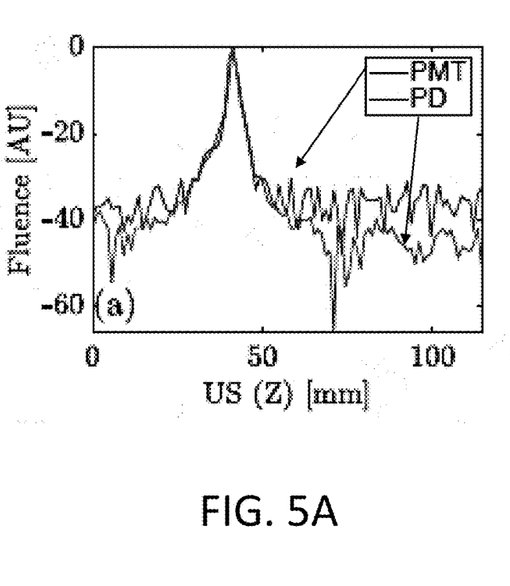
FIG. 5A-5B shows a graph of an experimental 1D profile of the fluence inside the phantom mapped in the ultrasound (z) and scan (y) dimensions according to some embodiments of the invention.
Figure 5B:
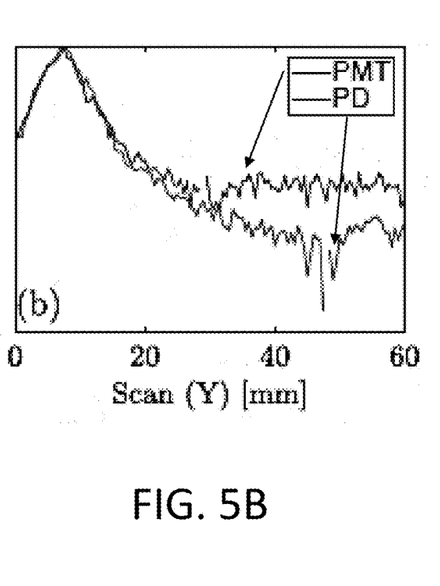

FIGS. 5A and 5B show graphs of experimental 1D profile of the fluence inside subject 5 mapped in the ultrasound (z) and scan (y) dimensions, respectively, according to some embodiments of the invention. Once the intensity of reference beam 24 was set to maximal SNR gain, the 1D profile was mapped in two directions. In the z dimension (FIG. 5A) the mapping was performed using the time-of-flight principle, whereas in the y dimension the ultrasound transducer 86 was mechanically scanned with a step size of 0.5 mm. The measurement was conducted for both the homodyne embodiment (e.g., system 100 with photodetector assembly 70) and conventional TD-AOI setups, and the results are presented in FIGS. 5A and 5B for the z and y scans, respectively. In both cases, the same spatial profiles were obtained for the AOI signals both the technique. In terms of sensitivity, the noise level in the PMT-based measurement was higher by approximately 10 dB than the one performed with a photodiode, leading to a difference in penetration depths of over 1 cm in FIG. 5B.

Figure 6:
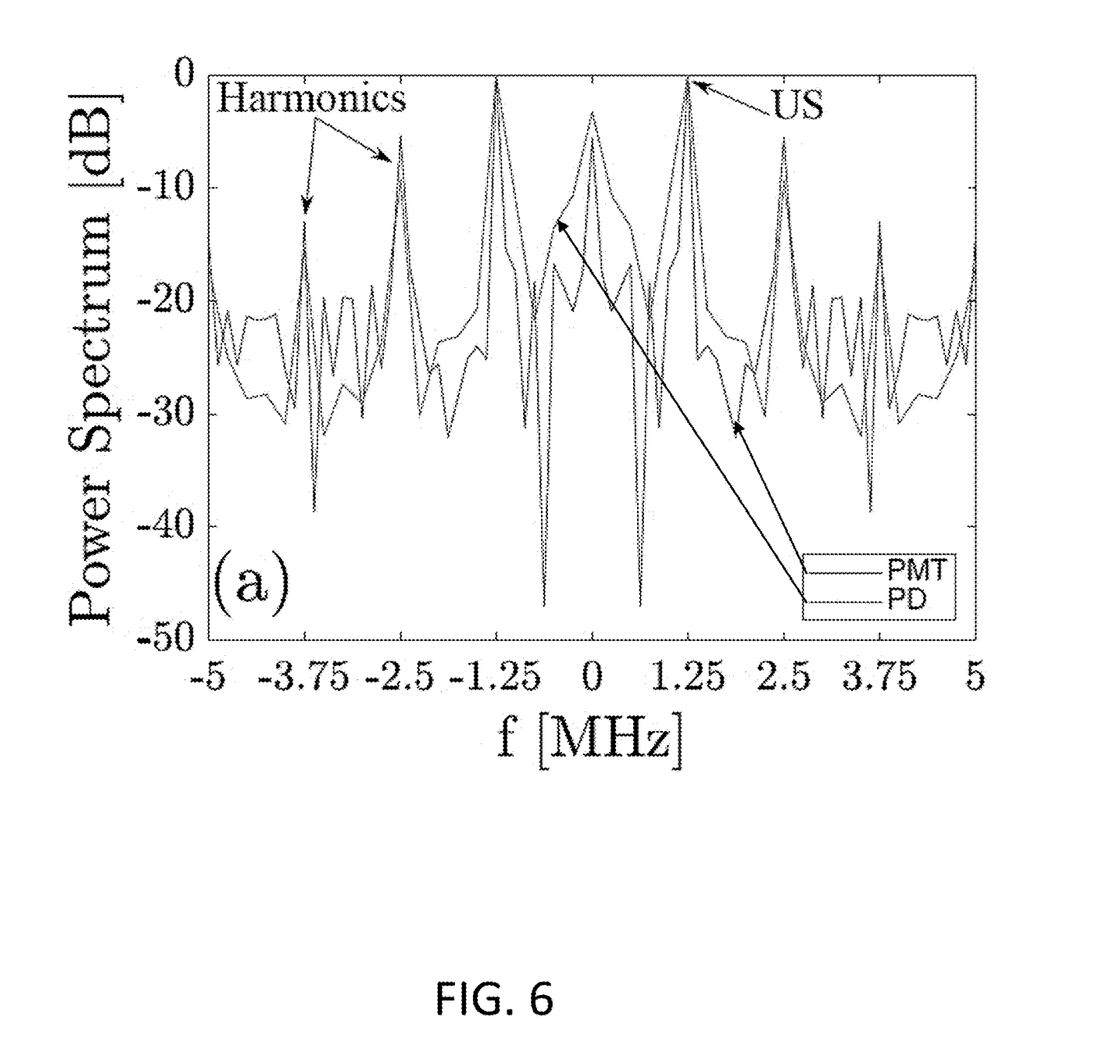
FIG. 6 shows a graph of experimental results of normalized power spectra of homodyne and conventional TD-AOI signals compared in the frequency domain according to some embodiments of the invention.
Figure 7:
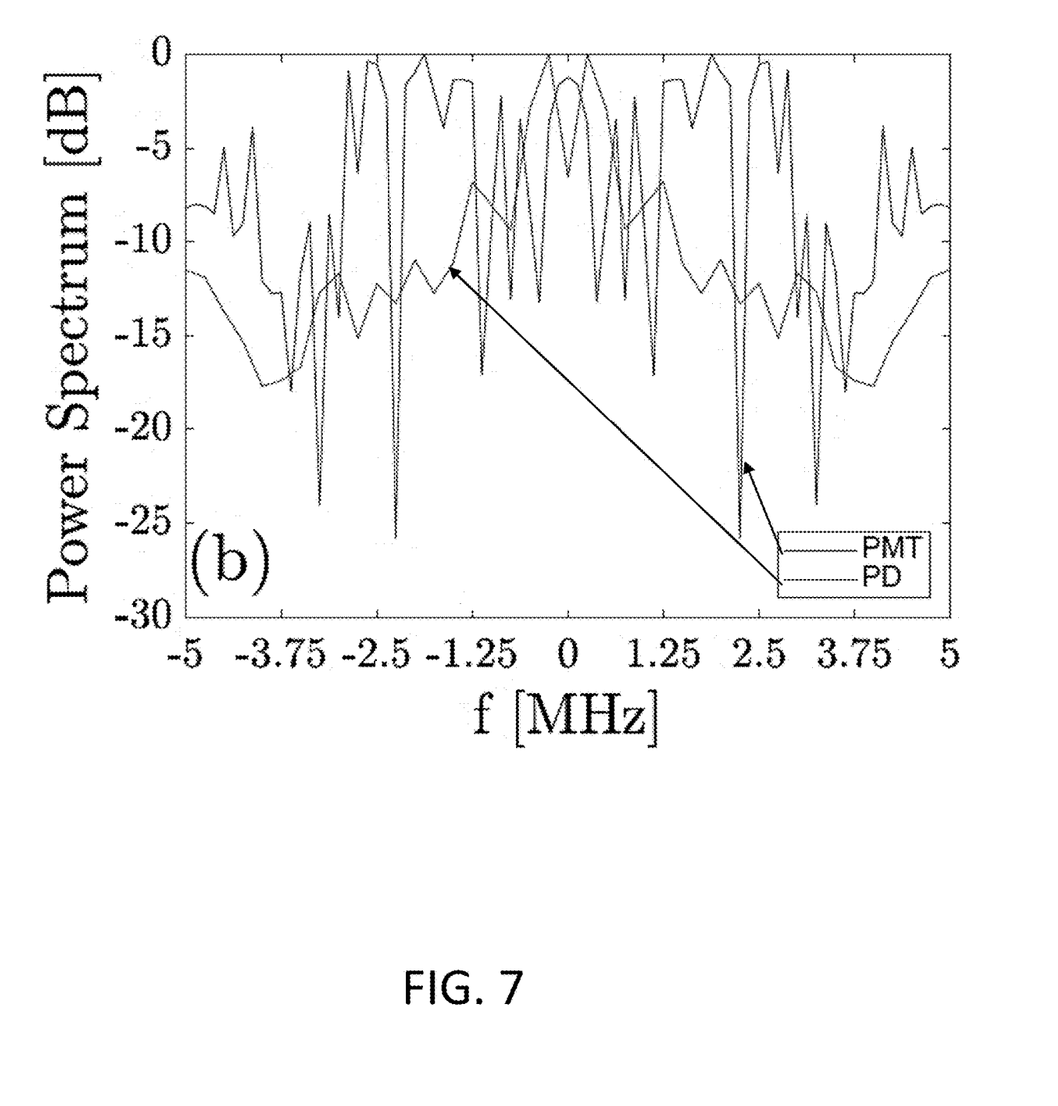
FIG. 7 shows a graph of experimental results of normalized power spectra of homodyne and conventional TD-AOI signals compared in the frequency domain in a deeper region of tissue according to some embodiments of the invention.

The results of homodyne system 100 and conventional TD-AOI were compared in the frequency domain. FIGS. 6-7 shows the normalized power spectra of the AOI signals according to some embodiments of the invention, for the spatial positions x and x in which the strongest signals were obtained. FIG. 6 shows that both techniques led the same spectral behavior, with a strong response at the US frequency $f_{us}=1.25$ MHz, and weaker responses obtained at higher harmonics. FIG. 7 shows the power spectra obtained according to an embodiment of the invention at a deeper region in the tissue of subject 5 in which the response is −35 dB than at the maximum. The figure reveals that homodyne system 100 according to an embodiment of the invention achieved a noise level that was approximately 10 dB lower, enabling the detection of the AOI modulation at 1.25 MHz.

Reference is now made to FIG. 8, which is a block diagram depicting a computing device, which may be included within an embodiment of a system for AOI, according to some embodiments.

Computing device 10 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 10 may be included in, and one or more computing devices 10 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 10, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data related to AOI may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 10 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 10 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A laser system for acousto-optics imaging, comprising:
   a continuous wave laser source;
   a first beam splitter configured to split a laser emitted by the continuous wave laser source into a lasing beam and a reference beam;
   a lasing optical fiber diffusing the lasing beam to a subject;
   a reference optical fiber providing the reference beam;
   a collecting optical fiber capable of receiving a scattered beam from the subject;
   a second beam splitter for merging the scattered and reference beams into a merged beam, and
   at least one photodetector assembly with a bandwidth higher than an ultrasound frequency to detect the merged beam.

2. The system of claim 1, further comprising:
   a processor;
   a function generator controlled by the processor to create an arbitrary function for an ultrasound wave, and
   an ultrasound transducer controlled by the function generator to produce the ultrasound wave and receive a reflected ultrasound wave from the subject,
   wherein the controller is further configured to:
   process the reflected ultrasound wave and a signal from the at least one photodetector assembly to generate an image.

3. The system according to claim 1, wherein the at least one photodetector assembly comprises: a photodiode, an amplifier, and a voltage buffer.

4. The system according to claim 3, wherein the at least one photodetector assembly lacks an internal gain of the photocurrent.

5. The system according to claim 1, wherein a power of the continuous wave laser is splitted between the lasing beam and the reference beam, where the ratio between the power that is delivered to the subject and the power that is transmitted from the reference beam is 100 to 1.

6. The system according to claim 1, where the reference beam is polarized and fed through polarization-maintaining single mode optical fiber.

7. The system according to claim 1 wherein the length of the reference beam fiber is the sum of the length of the collecting fiber and the lasing fiber.

8. A method of acousto-optics imaging, comprising:
   a. activating a continuous wave laser to generate a continuous wave laser beam;
   b. splitting the continuous wave laser beam to a reference beam and a lasing beam;
   c. projecting the lasing beam onto a subject;
   d. collecting scattered light from the subject;
   e. merging the scattered light with the reference beam, creating a merged beam,
   f. delivering the merged beam to at least one photodetector assembly;
   g. processing the reflected ultrasound wave and a signal of the at least one photodetector assembly; and
   h. generating an ultrasound image of the subject's tissue on which the signals from the at least one photodetector assembly is overlaid.

9. The method according to claim 8, further comprising:
   generating an arbitrary function for an ultrasound wave using a processor;
   activating an ultrasound transducer to propagate the ultrasound wave generated at the arbitrary function through the subject's tissue, and
   receiving a reflected ultrasound wave from the subject.

10. The method according to claim 8, wherein the lasing beam is diffused into the subject's tissue.

11. The method according to claim 8, wherein the splitting of the continuous wave laser beam is conducted by a first beam splitter.

12. The method according to claim 8, wherein the merging of the scattered light with the reference beam is conducted by a second beam splitter.

13. The method according to claim 8, wherein scattered light from the subject's tissue is projected onto an optical fiber.

14. The method according to claim 8, wherein the reference beam is coupled into a polarization-maintaining single mode optical fiber and projected onto the second beam splitter.

15. The method according to claim 8, further comprising of coupling the merged beam into a multimode optical fiber to deliver the merged beam to the at least one photodetector assembly.

16. The method according to claim 8, wherein each photodetector assembly comprises: a photodiode, an amplifier, and a voltage buffer.

17. The method according to claim 8, wherein a total time frame for steps a. through f. is at most 1 ms.

* * * * *